(12) United States Patent
Cheng

(10) Patent No.: US 12,459,806 B2
(45) Date of Patent: Nov. 4, 2025

(54) BEVERAGE PREPARATION SYSTEM

(71) Applicant: Kuang-F Cheng, Taoyuan (TW)

(72) Inventor: Kuang-F Cheng, Taoyuan (TW)

( * ) Notice: Subject to any disclaimer, the term of this patent is extended or adjusted under 35 U.S.C. 154(b) by 74 days.

(21) Appl. No.: 18/479,239

(22) Filed: Oct. 2, 2023

(65) Prior Publication Data

US 2025/0109007 A1 Apr. 3, 2025

(51) Int. Cl.
*B67D 3/00* (2006.01)
(52) U.S. Cl.
CPC .................. *B67D 3/0077* (2013.01)
(58) Field of Classification Search
CPC ............... B67D 3/0077; B67D 7/02
See application file for complete search history.

(56) References Cited

U.S. PATENT DOCUMENTS

| | | | | |
|---|---|---|---|---|
| 8,176,948 B2* | 5/2012 | Carrig | ...................... | H04W 4/08 141/82 |
| 8,973,822 B2* | 3/2015 | Brown | .................. | G07F 13/025 235/383 |
| 11,939,203 B2* | 3/2024 | Dorney | .................. | B67D 1/124 |
| 2003/0051767 A1* | 3/2003 | Coccaro | ................. | B67D 7/348 141/351 |

FOREIGN PATENT DOCUMENTS

| | | |
|---|---|---|
| CN | 111543837 | 8/2020 |
| CN | 113080703 | 7/2021 |
| CN | 115211725 | 10/2022 |

* cited by examiner

*Primary Examiner* — Timothy L Maust
(74) *Attorney, Agent, or Firm* — Muncy, Geissler, Olds & Lowe, P.C.

(57) ABSTRACT

A beverage preparation system comprises a beverage source, a beverage preparation device, a drinking container, a first short-range communication device, a second short-range communication device. The first short-range communication device is situated on the wall portion of the drinking container, which has a first coupling surface oriented outwardly. The second short-range communication device situated on an adjacent region of the beverage preparation device, which includes a first and a second transceiver unit. Each of the first and second transceiver units includes a second coupling surface adjacent to a pouring spot. The second coupling surfaces orient towards different directions to build an expanded transceiver coverage covering the pouring spot, which enables the coupling of at least one of the second coupling surfaces with the first coupling surface, in instances where the drinking container is within a surrounding region in proximity to the pouring spot without deliberate alignment.

11 Claims, 7 Drawing Sheets

BEVERAGE PREPARATION SYSTEM

FIELD OF THE INVENTION

The present disclosure relates to a beverage preparation system, and more particularly to a beverage preparation system with wireless communication interface.

BACKGROUND OF THE INVENTION

The water dispenser holds a crucial role among essential household appliances for everyday living. It not only dispenses mineral water or filtered water, but also offers water at various temperatures for drinking purposes. Modern water dispensers have incorporated communication capabilities, like near-field communication (NFC), which enable them to access user information from the connections established between the water dispenser and the water container. This functionality encompasses features such as measuring water consumption, tracking drinking patterns, and more. The above techniques have found various implementations in the prior arts, such as Chinese Patents No. CN115211725A, CN113080703A, and CN111543837A.

Nevertheless, the aforementioned prior arts exhibit a limitation in their ability to retrieve information from the user's water container due to a restricted reading signal range and blind spots. Consequently, this constraint leads to incomplete information retrieval and potential inaccuracies.

SUMMARY OF THE INVENTION

Example beverage preparation system is disclosed herein. An example beverage preparation system comprises: a beverage source; a beverage preparation device comprising a body, a discharge nozzle connected to the body, an adjacent region of a casing on the body and a pouring spot, the discharge nozzle being in fluid connection with the beverage source to dispense a beverage stream, the pouring spot being configured to receive a downstream of the beverage stream, while the adjacent region is proximate to the pouring spot; a drinking container comprising a wall portion and an enclosed space defined by the wall portion, the drinking container being configured to be placed at the pouring spot by a user so as to receive the beverage stream discharged from the nozzle; a first short-range communication device situated on the wall portion of the drinking container, the first short-range communication device having a first coupling surface oriented outwardly; and a second short-range communication device situated on the adjacent region of the beverage preparation device, the second short-range communication device including a first transceiver unit and a second transceiver unit, each of the first and second transceiver units including a second coupling surface adjacent to the pouring spot; wherein the second coupling surfaces of the first and second transceiver units of the second short-range communication device orient towards different directions to build an expanded transceiver coverage covering the pouring spot, which enables the coupling of at least one of the second coupling surfaces of either the first transceiver unit or the second transceiver unit of the second short-range communication device with the first coupling surface of the first short-range communication device, in instances where the drinking container is within a surrounding region in proximity to the pouring spot without deliberate alignment between the first coupling surface and the second coupling surfaces.

Example beverage preparation system is disclosed herein. An example beverage preparation system comprises: a beverage source; a beverage preparation device comprising a body, a discharge nozzle connected to the body, an adjacent region of a casing on the body and a pouring spot, the discharge nozzle being in fluid connection with the beverage source to dispense a beverage stream, the pouring spot being configured to receive a downstream of the beverage stream, while the adjacent region is proximate to the pouring spot; a drinking container comprising a wall portion and an enclosed space defined by the wall portion, the drinking container being configured to be placed at the pouring spot by a user so as to receive the beverage stream discharged from the nozzle; a first short-range communication device situated on the wall portion of the drinking container, the first short-range communication device including a first transceiver unit and a second transceiver unit, each of the first and second transceiver units including a first coupling surface oriented outwardly; and a second short-range communication device situated on the adjacent region of the beverage preparation device, the second short-range communication device including a second coupling surface adjacent to the pouring spot; wherein the first coupling surfaces of the first and second transceiver units of the first short-range communication device orient towards different directions to build an expanded transceiver coverage surrounding the drinking container, which enables the coupling of at least one of the first coupling surfaces of either the first transceiver unit or the second transceiver unit of the first short-range communication device with the second coupling surface of the second short-range communication device, in instances where the drinking container is within a surrounding region in proximity to the pouring spot without deliberate alignment between the first coupling surface and the second coupling surfaces.

DETAILED DESCRIPTION OF THE PREFERRED EMBODIMENTS

Figure 1:
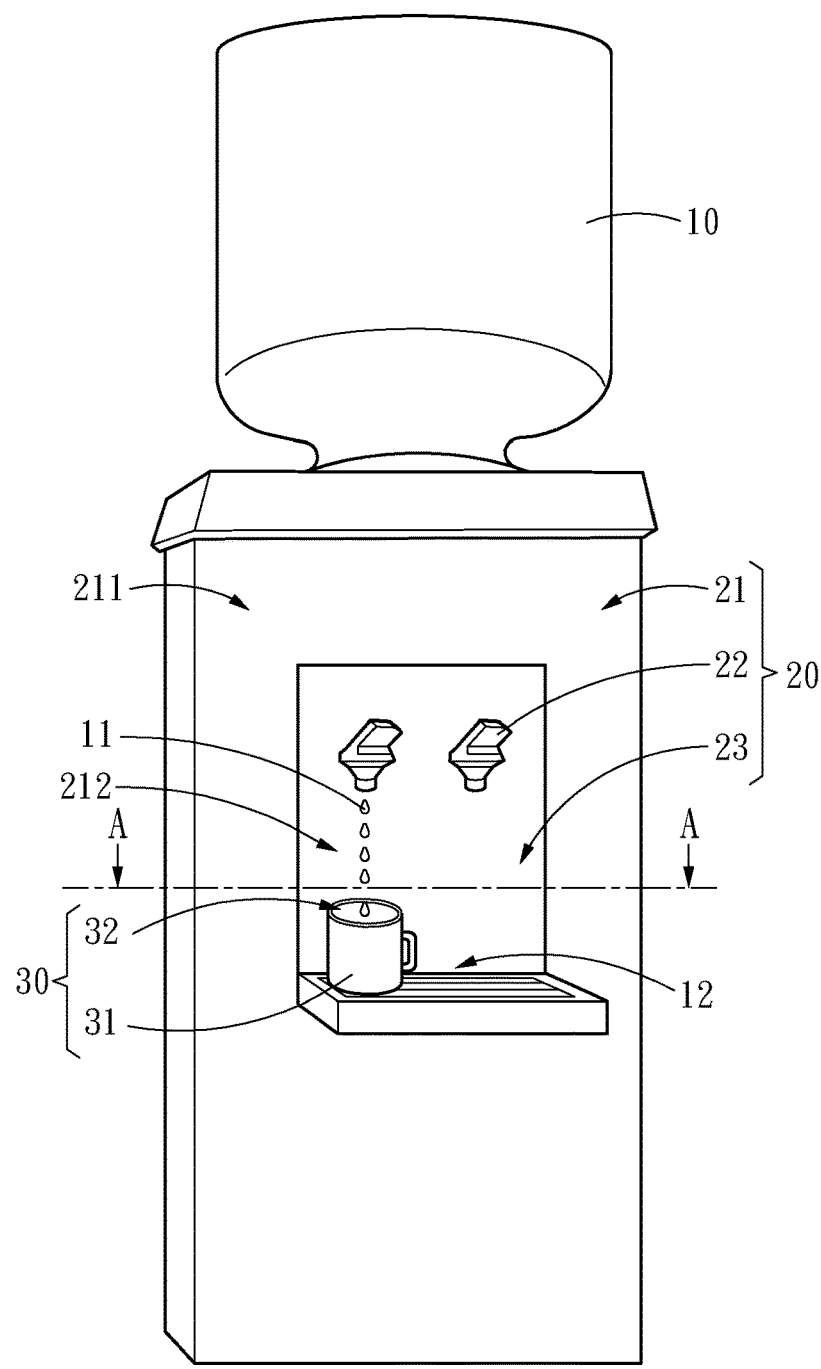
FIG. 1 illustrates an exemplary beverage preparation system, according to various examples.

The terminology used herein is for the purpose of describing particular embodiments only and is not intended to limit the invention. As used herein, the singular forms "a" and "the" may also include plural forms unless the context dictates otherwise.

Directional terms used herein, such as up, down, left, right, front, back, and their derivatives or synonyms, refer to the orientation of elements in the drawings and do not limit the invention unless the context clearly states otherwise.

In FIG. 1, the present invention reveals a beverage preparation system 1. This system includes a beverage supply source 10, a beverage preparation device 20, and a drinking container 30. In the first embodiment, the beverage preparation system 1 incorporates a first short-range communication device 40 and a second short-range communication device 50 (illustrated in FIG. 2A and FIG. 2B). In the second embodiment, the beverage preparation system 1 incorporates a first short-range communication device 60 and a second short-range communication device 70 (illustrated in FIG. 3A and FIG. 3B). In one embodiment of the present invention, either or both of the first short-range communication device 40, 60 and the second short-range communication device 50, 70 may include more than two or more transceiver units, such that connection coverages between the first short-range communication device 40, 60 and the second short-range communication device 50, 70 could be wider and the connection would be easily established when the drinking container 30 approaches the beverage preparation device 20.

In one example, the beverage preparation system 1 is configured to supply drinking water. The beverage supply source 10 and the beverage preparation device 20 are combined as an in-home drinking water system, and the beverage supply source 10 may be a replaceable bottled water or a reverse osmosis filtered water supply device. In the present embodiment, the beverage supply source 10 is the replaceable bottled water and the beverage preparation device 20 is a top-load water dispenser, as depicted in FIG. 1.

In other examples, the in-home drinking water system and/or the beverage preparation device 20 may be any type or form of the device for supply drinking water, such as, but not limited to, a mounted water dispenser, a point-of-use water dispenser, a countertop water dispenser, an undercounter water dispenser, a floor-standing water dispenser, a wall-mounted water dispenser, or a filtered water dispenser. In further examples, the beverage supply source 10 and the beverage preparation device 20 may be combined as a coffee machine, a beer brewing machine, or any other beverage machine for supplying various beverages. The drinking container 30 also may be any type or form, such as, but not limited to, a mug, a cup, a kettle, a tumbler, a jug, a mason jar, or a flask.

The beverage preparation device 20 is fluidly connected to the beverage supply source 10. The beverage preparation device 20 includes a body 21, an outlet nozzle 22 and an adjacent portion 23. The body 21 includes a casing 211, which comprises a front wall portion 212 disposed beneath the outlet nozzle 22. The outlet nozzle 22 is coupled to the body 21 and fluidly connected to the beverage supply source 10 for dispensing a beverage stream 11, which is a drinking water flow in the present embodiment. A pouring spot is defined by a downstream of the beverage stream 11 near the body 21, which is a spot for placing the drinking container 30 to fill or replenish the water. A surrounding region 12 is provided in proximity to the pouring spot. In one example, the adjacent portion 23 is disposed on the casing 211 of the body 21 in proximity to the surrounding region 12. The drinking container 30 includes a wall portion 31 and an enclosed space 32 defined by the wall portion 31.

Figure 2A:
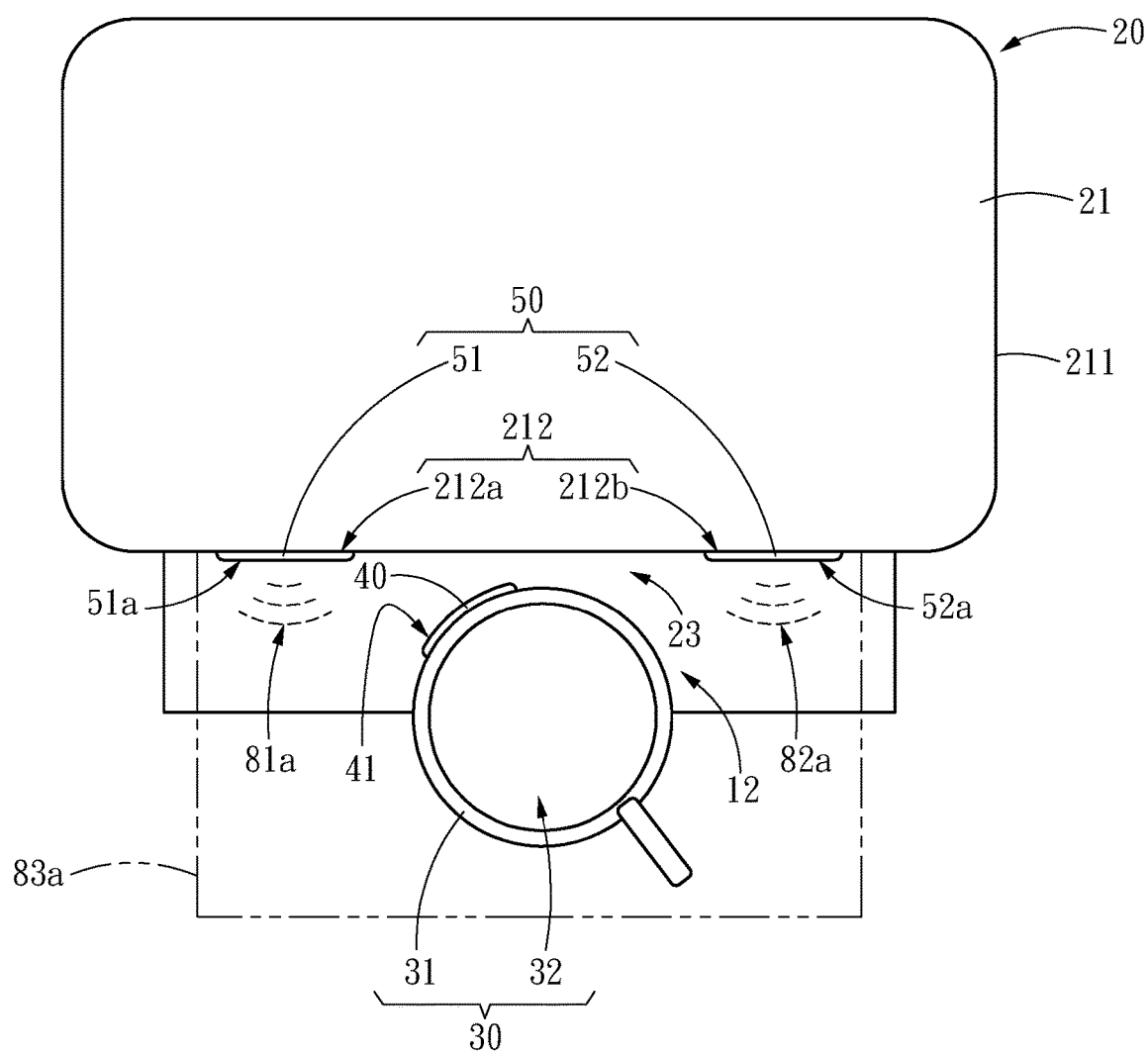
FIGS. 2A-2B illustrate an exemplary beverage preparation system, according to first embodiment.

In reference to FIG. 2A, a first variation of the first embodiment describes the first short-range communication device 40 being positioned on the wall portion 31 of the drinking container 30. The first short-range communication device 40 has a first coupling surface 41 oriented outwardly. On the other hand, the second short-range communication device 50 is placed on the adjacent portion 23 of the beverage preparation device 20. The second short-range communication device 50 includes two or more transceiver units. In the first variation, the second short-range communication device 50 includes a first transceiver unit 51 and a second transceiver unit 52, situated respectively on a left region 212a and a right region 212b of the front wall portion 212. Each of the first transceiver unit 51 and the second transceiver unit 52 has a second coupling surface, namely, 51a and 52a. The first short-range communication device 40 and the second short-range communication device 50 are able to be paired with each other such that data may be transferred between each other. The orientations of the second coupling surface 51a, 52a play role in defining a region only within which the first short-range communication device 40 could be wirelessly connected with the second short-range communication device 50.

To provide a wider coverage for establishing short-range wireless communications, the second coupling surfaces 51a and 52a of the first transceiver unit 51 and the second transceiver unit 52 have different orientations aligning to a first direction 81a and a second direction 82a, respectively. Consequently, an expanded transceiver coverage 83a is built on the surrounding region 12. When the drinking container 30 is moved and enters to the surrounding region 12 for the purpose of filling the beverage, the first coupling surface 41 of the first short-range communication device 40 would be easily within the transceiver coverage 83a and establish wireless communication with the second coupling surface 51a of the first transceiver unit 51 and/or the second coupling surface 52a of the second transceiver unit 52. When the drinking container 30 is going to be poured with the beverage stream 11, the first short-range communication device 40 falls within the transceiver coverage 83a, allowing the first short-range communication device 40 to receive and transfer signals from the first transceiver unit 51 and/or the second transceiver unit 52.

Figure 2B:
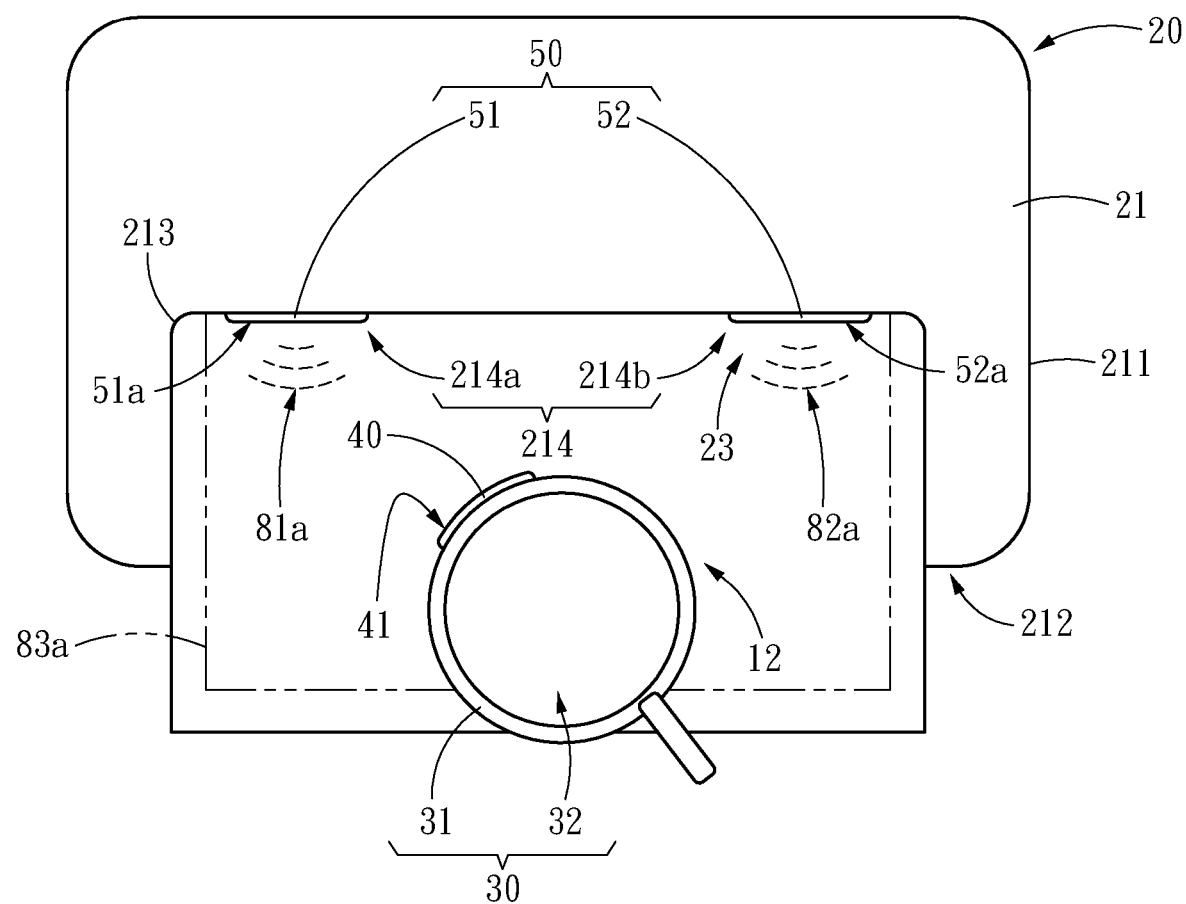

FIG. 2B illustrates a second variation of the first embodiment, the front wall portion 212 includes a concave surface 213 and a recess 214. The concave surface 213 is formed on the front wall portion 212 and concaved rearward, which thus defines the recess 214 in front of the front wall portion 212. The recess 214 has a left area 241a and a right area 214b. The first transceiver unit 51 and second transceiver unit 52 are separately disposed in the left area 214a and the right area 214b.

In one example, the first short-range communication device 40 and the second short-range communication device 50 are able to wirelessly communicate with each other in accordance with a wireless protocol, which is in accordance with Institute of Electrical and Electronics Engineers (IEEE) 802.11 family of standards, Bluetooth protocol, near field communications (NFC) protocol, IEEE 802.15.4 standard protocol, Radio Frequency Identification (RFID) protocol or Zigbee protocol. In this embodiment, the first short-range communication device 40 is an NFC tag, while the first transceiver unit 51 and second transceiver unit 52 of the second short-range communication device 50 are NFC readers.

Figure 3A:
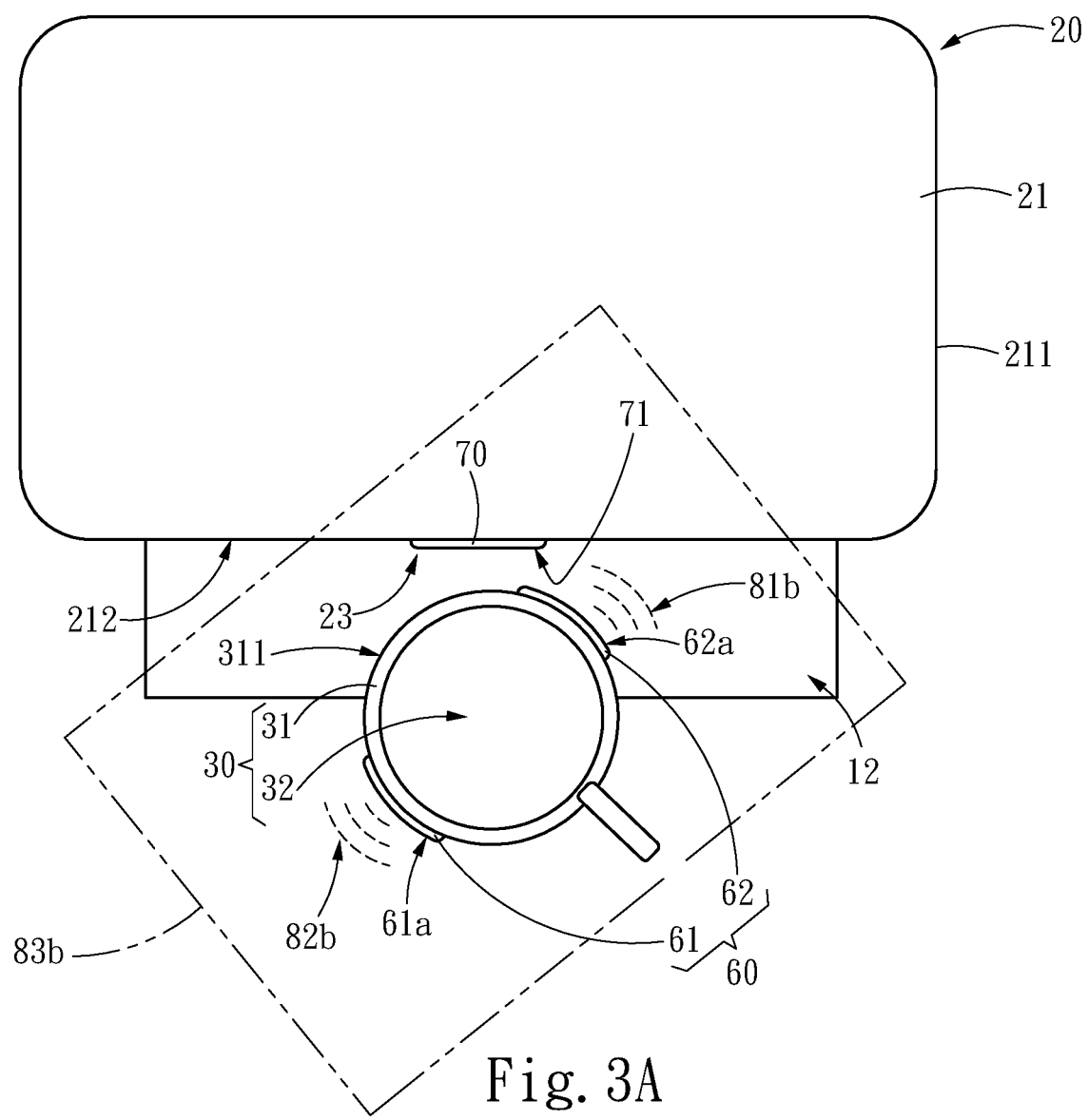
FIGS. 3A-3B illustrate an exemplary beverage preparation system, according to second embodiment.

Turning attention to FIG. 3A, in the first variation of the second embodiment, the first short-range communication device 60 is arranged on the wall portion 31 on the drinking container 30, and the wall portion 31 includes a circumferential wall 311. The first short-range communication device 60 includes two or more transceiver units. In the first variation, the first short-range communication device 60 includes a first transceiver unit 61 and a second transceiver unit 62, the second short-range communication device 70 includes one transceiver unit. The first transceiver unit 61 and the second transceiver unit 62 are separately arranged along a periphery of the circumferential wall 311. In an example, the first transceiver unit 61 and the second transceiver unit 62 may be disposed on a left area and a right area of the wall portion 31. The first transceiver unit 61 and the second transceiver unit 62 of the first short-range communication device 60 respectively have a first coupling surface 61a, 62a oriented outwardly. The first coupling surfaces 61a, 62a of the first transceiver unit 61 and the second transceiver unit 62 have different orientations aligning to a first direction 81b and a second direction 82b, respectively. Consequently, an expanded transceiver coverage 83b is built around the drinking container 30.

The second short-range communication device 70 is disposed on the adjacent portion 23 of the beverage preparation device 20. The second short-range communication device 70 includes one transceiver unit which has a second coupling surface 71. The second coupling surface 71 is configured to orient toward the surrounding region 12, so that when the drinking container 30 enters into the surrounding region 12 for the purpose of pouring the beverage, the first coupling surface 61a of the first transceiver unit 61 and/or the first coupling surface 62a of the second transceiver unit 62 would be easily positioned within the transceiver coverage 83a and establish wireless communication with the second coupling surface 71 of the transceiver unit of the second short-range communication device 70.

Figure 3B:
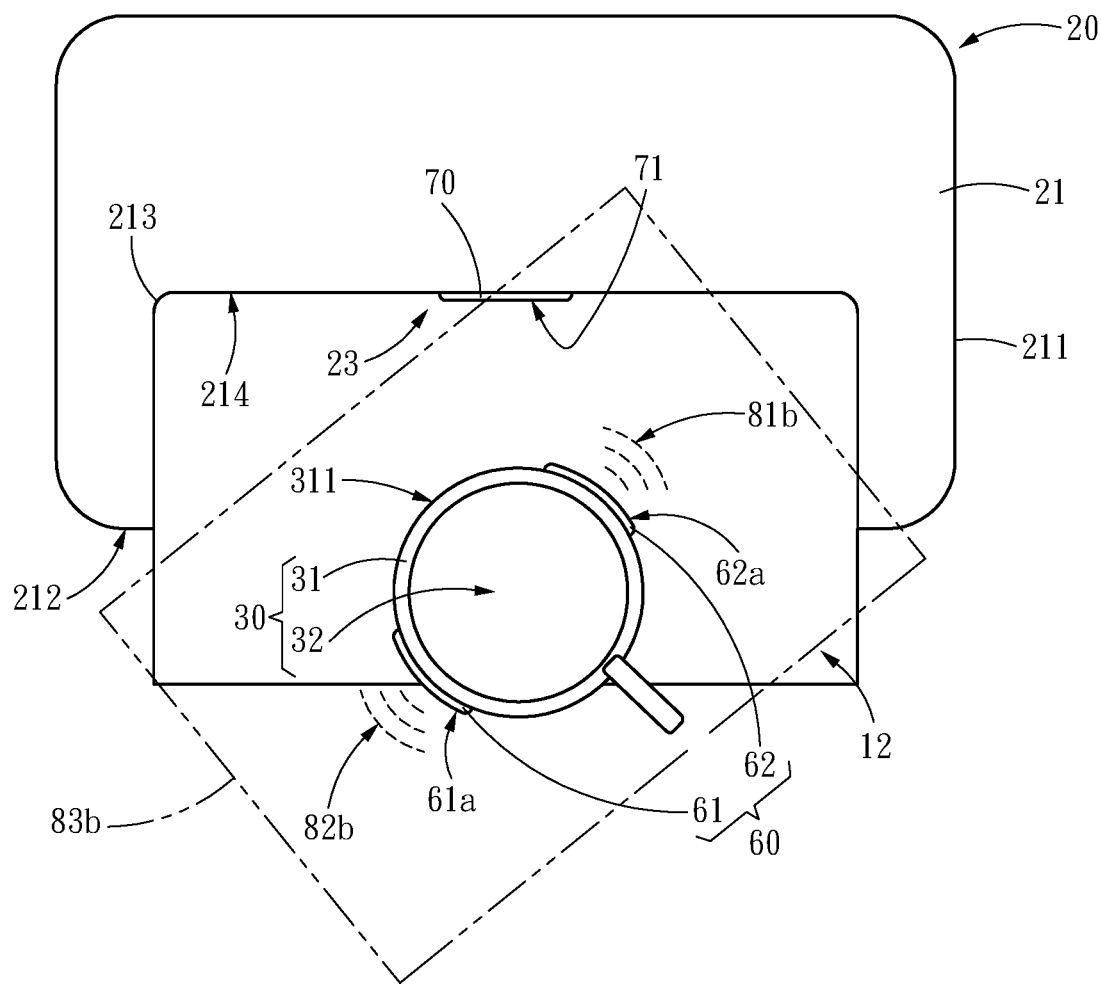

Referring to FIG. 3B, in the second variation of the second embodiment, the front wall portion 212 has a concave surface 213 and a recess 214. The concave surface 213 is formed on the front wall portion 212 and concaved rearward, which thus defines the recess 214 in front of the front wall portion 212. The second short-range communication device 70 is disposed in the recess 214.

In one example, the first short-range communication device 60 and the second short-range communication device 70 are able to wirelessly communicate with each other in accordance with a wireless protocol, which is in accordance with Institute of Electrical and Electronics Engineers (IEEE) 802.11 family of standards, Bluetooth protocol, near field communications (NFC) protocol, IEEE 802.15.4 standard protocol, Radio Frequency Identification (RFID) protocol or Zigbee protocol. In this embodiment, the first transceiver unit 61 and the second transceiver unit 62 of the first short-range communication device 60 are NFC tags, while the transceiver unit of the second short-range communication device 70 is an NFC reader.

Figure 4:
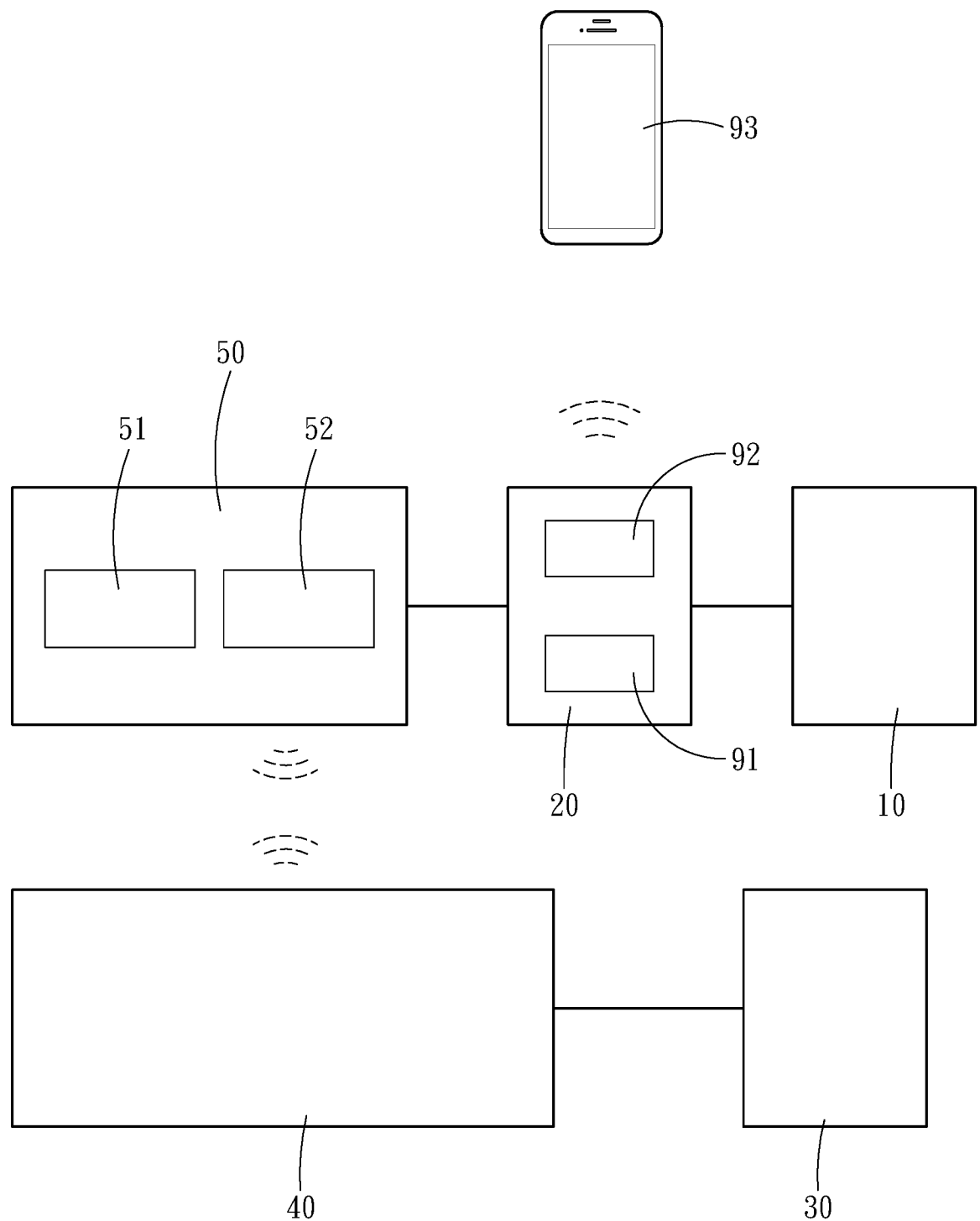
FIGS. 4-5 illustrates an exemplary beverage preparation system, according to other embodiments.
Figure 5:
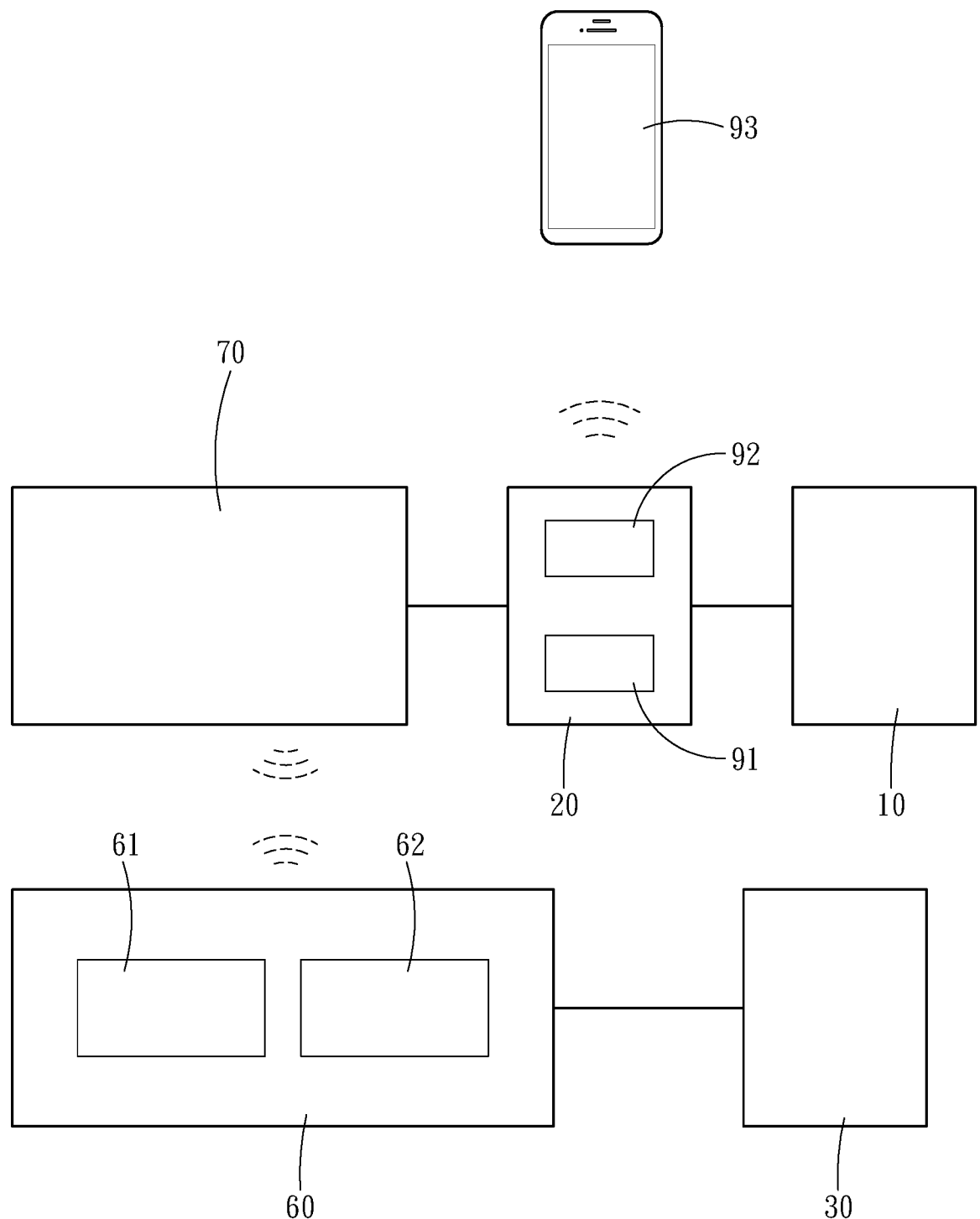

FIG. 4 and FIG. 5 illustrate other embodiments according to the present disclosure, the beverage preparation system 1 may further include an input interface (such as touch-sensitive display screen or buttons), a database, a control unit 91, and a communication unit 92, which are incorporated into the beverage preparation device 20. The input interface is configured for the user to activate and operate the beverage preparation device 20. In an example, the beverage preparation device 20 is a programmable beverage preparation device which may produce a customized beverage in accordance with at least one configuration parameters. The configuration parameters may include a beverage size, beverage additives, flavors, aromas, minerals, mineral solutions, a carbonation level, a beverage temperature or the combination thereof.

The control unit 91 connects with the second short-range communication device 50 (or the second short-range communication device 70) located on the beverage preparation device 20 through the communication unit 92 and is able to retrieve data from and transfer data to the second short-range communication device 50 (or the second short-range communication device 70) and the first short-range communication device 40 (or the first short-range communication device 60) through the wireless communication.

The communication unit 92 may wirelessly communicate with a wireless communication device 93 (such as a cellular phone, laptop, tablet, wearable device, smart watch, smart glass, headphone, or any electronic device capable of wireless communication) using a communication interface, which may be narrowband Internet of Things, 3G/4G/5G communication network, WiFi network, Zigbee network and Bluetooth network.

The database may be a local database, a cloud-based database, or both local and cloud-based databases, which stores user's profile, the user's configuration parameters, beverage consumption of the user and other data. The user may create or configure the user's profile and the configuration parameters. The user's profile may be associated with one or more configuration parameters and also associated with the first short-range communication device.

The database may further store one or more computer readable instructions that, when executed by at least one processor in the control unit 91, cause the beverage preparation device 20 to produce and dispense the customized beverage in accordance with the configuration parameters and/or the user's inputs; and record data of dispensing by a particular user, such as data and time of beverage dispensing, size (volume or weight) of beverage dispensing, the configuration parameters of beverage dispensing and etc.

It is to be understood that the first short-range communication devices 40, 60 disposed on the drinking container 30 may be used to associated with a particular user. That is, the pre-selected short-range communication device may be assigned to the particular user. When the particular user holds the drinking container 30 and places the drinking container 30 in the surrounding region 12 as well as within the transceiver coverage 83a, the first short-range communication devices 40, 60 will establish wireless communication with the second short-range communication devices 50, 70.

In one example, the control unit 91 may retrieve the particular user's profile and the particular user's configuration parameters by identifying the particular user from the assigned first short-range communication devices 40, 60. Thereafter, the control unit 91 may instruct a beverage preparation unit of the beverage preparation device 20 to produce the customized beverage in accordance with the configuration parameters.

In another example, the control unit 91 may record data of dispensing by the particular user and the data maybe stored in the database. Taking the hydration intake as an example, the processor may generate a historical water intake data for the particular user based on the recorded data. By viewing the historical water intake data, the user may track and monitor the water intake over a period and see if he hits the target each day. If the user didn't intake the target amount of water, the system 1 may send an alert message to the wireless communication device 93 to remind the user. If the user intake the target amount of water, the system 1 may send an notification message to the wireless communication device 93 to notify the user. In other words, the system 1 may improve the behavior of drinking water and prevent dehydration.

It should be emphasized that the above-described embodiments and examples of the present disclosure are merely possible implementations set forth for a clear understanding of the principles of the disclosure. Many variations and modifications may be made to the above-described embodiments and examples without departing substantially from the spirit and principles of the disclosure. All such modifications and variations are intended to be included herein within the scope of this disclosure and protected by the following claims.

What is claimed is:

1. A beverage preparation system, comprising:
a beverage source;
a beverage preparation device comprising a body, a discharge nozzle connected to the body, an adjacent region of a casing on the body and a pouring spot, the discharge nozzle being in fluid connection with the beverage source to dispense a beverage stream, the pouring spot being configured to receive a downstream of the beverage stream, while the adjacent region is proximate to the pouring spot;
a drinking container comprising a wall portion and an enclosed space defined by the wall portion, the drinking container being configured to be placed at the pouring spot by a user so as to receive the beverage stream discharged from the discharge nozzle;
a first short-range communication device situated on the wall portion of the drinking container, the first short-range communication device having a first coupling surface oriented outwardly; and
a second short-range communication device situated on the adjacent region of the beverage preparation device, the second short-range communication device including a first transceiver unit and a second transceiver unit, each of the first and second transceiver units including a second coupling surface adjacent to the pouring spot;
wherein the second coupling surfaces of the first and second transceiver units of the second short-range communication device orient towards different directions, the first and second transceiver units of the second short-range communication device jointly build an expanded transceiver coverage covering the pouring spot and the expanded transceiver coverage enables the coupling of at least one of the second coupling surfaces of either the first transceiver unit or the second transceiver unit of the second short-range communication device with the first coupling surface of the first short-range communication device, in instances where the drinking container is within a surrounding region in proximity to the pouring spot without deliberate alignment between the first coupling surface and the second coupling surfaces.

2. The beverage preparation system of claim 1, wherein the casing includes a front wall portion located below the discharge nozzle, and the first transceiver unit and the second transceiver unit are respectively arranged in a left area and a right area of the front wall portion.

3. The beverage preparation system of claim 1, wherein the casing includes a front wall portion, the front wall portion includes a concave surface concaved inwardly and a recess defined by the concave surface, the first transceiver unit and the second transceiver unit are respectively arranged on a left area and a right area of the recess.

4. The beverage preparation system of claim 1, wherein the first short-range communication device establishes a connection with the second short-range communication device in accordance with a wireless communication protocol, which is in accordance with the Institute of Electrical and Electronics Engineers (IEEE) 802.11 family of standards, Bluetooth protocol, near field communications (NFC) protocol, IEEE 802.15.4 standard protocol, Radio Frequency Identification (RFID) protocol or Zigbee protocol.

5. A beverage preparation system, comprising:
a beverage source;
a beverage preparation device comprising a body, a discharge nozzle connected to the body, an adjacent region of a casing on the body and a pouring spot, the discharge nozzle being in fluid connection with the beverage source to dispense a beverage stream, the pouring spot being configured to receive a downstream of the beverage stream, while the adjacent region is proximate to the pouring spot;
a drinking container comprising a wall portion and an enclosed space defined by the wall portion, the drinking container being configured to be placed at the pouring spot by a user so as to receive the beverage stream discharged from the discharge nozzle;
a first short-range communication device situated on the wall portion of the drinking container, the first short-range communication device including a first transceiver unit and a second transceiver unit, each of the first and second transceiver units including a first coupling surface oriented outwardly; and
a second short-range communication device situated on the adjacent region of the beverage preparation device, the second short-range communication device including a second coupling surface adjacent to the pouring spot;
wherein the first coupling surfaces of the first and second transceiver units of the first short-range communication device orient towards different directions, the first and second transceiver units of the first short-range communication device jointly build an expanded transceiver coverage surrounding the drinking container, and the expanded transceiver coverage enables the coupling of at least one of the first coupling surfaces of either the first transceiver unit or the second transceiver unit of the first short-range communication device with the second coupling surface of the second short-range communication device, in instances where the drinking container is within a surrounding region in proximity to the pouring spot without deliberate alignment between the first coupling surface and the second coupling surfaces.

6. The beverage preparation system of claim 5, wherein the first transceiver unit and the second transceiver unit are respectively arranged in a left area and a right area of the wall portion.

7. The beverage preparation system of claim 5, wherein the first short-range communication device establishes a connection with the second short-range communication device in accordance with a wireless communication protocol, which is in accordance with the Institute of Electrical and Electronics Engineers (IEEE) 802.11 family of standards, Bluetooth protocol, near field communications (NFC) protocol, IEEE 802.15.4 standard protocol, Radio Frequency Identification (RFID) protocol or Zigbee protocol.

8. A beverage preparation system, comprising:
a beverage source;
a beverage preparation device comprising a body, a discharge nozzle connected to the body, an adjacent region of a casing on the body and a pouring spot, the discharge nozzle being in fluid connection with the beverage source to dispense a beverage stream, the pouring spot being configured to receive a downstream of the beverage stream, while the adjacent region is proximate to the pouring spot;
a drinking container comprising a wall portion and an enclosed space defined by the wall portion, the drinking container being configured to be placed at the pouring spot by a user so as to receive the beverage stream discharged from the discharge nozzle;
a first short-range communication device situated on the wall portion of the drinking container, the first short-range communication device including a first transceiver unit and a second transceiver unit, each of the first and second transceiver units including a first coupling surface oriented outwardly; and a second short-range communication device situated on the adjacent region of the beverage preparation device, the second short-range communication device including a first transceiver unit and a second transceiver unit, each of the first and second transceiver units including a second coupling surface adjacent to the pouring spot;

wherein the first coupling surfaces of the first and second transceiver units of the first short-range communication device orient towards different directions, the first and second transceiver units of the first short-range communication device jointly build a first expanded transceiver coverage surrounding the drinking container, the second coupling surfaces of the first and second transceiver units of the second short-range communication device orient towards different directions, the first and second transceiver units of the second short-range communication device jointly build a second expanded transceiver coverage covering the pouring spot, and one of the first expanded transceiver coverage and the second expanded transceiver coverage enables the coupling of at least one of the first coupling surfaces of either the first transceiver unit or the second transceiver unit of the first short-range communication device with at least one of the second coupling surfaces of either the first transceiver unit or the second transceiver unit of the second short-range communication device, in instances where the drinking container is within a surrounding region in proximity to the pouring spot without deliberate alignment between the first coupling surfaces and the second coupling surfaces.

9. The beverage preparation system of claim 8, wherein the casing includes a front wall portion located below the discharge nozzle, and the first transceiver unit and the second transceiver unit are respectively arranged in a left area and a right area of the front wall portion.

10. The beverage preparation system of claim 8, wherein the casing includes a front wall portion, the front wall portion includes a concave surface concaved inwardly and a recess defined by the concave surface, the first transceiver unit and the second transceiver unit are respectively arranged on a left area and a right area of the recess.

11. The beverage preparation system of claim 8, wherein the first short-range communication device establishes a connection with the second short-range communication device in accordance with a wireless communication protocol, which is in accordance with the Institute of Electrical and Electronics Engineers (IEEE) 802.11 family of standards, Bluetooth protocol, near field communications (NFC) protocol, IEEE 802.15.4 standard protocol, Radio Frequency Identification (RFID) protocol or Zigbee protocol.

* * * * *